US009840241B2

(12) United States Patent
Murata et al.

(10) Patent No.: US 9,840,241 B2
(45) Date of Patent: Dec. 12, 2017

(54) BRAKE TEMPERATURE DETECTION DEVICE AND ELECTRIC PARKING BRAKE CONTROL DEVICE

(71) Applicant: Advics Co., Ltd., Kariya-shi, Aichi-ken (JP)

(72) Inventors: Shunsuke Murata, Aichi-ken (JP); Tetsuaki Tsuzuki, Gamagori (JP); Kentaro Yuasa, Tokai (JP)

(73) Assignee: ADVICS CO., LTD., Kariya, Aichi-Ken (JP)

(*) Notice: Subject to any disclaimer, the term of this patent is extended or adjusted under 35 U.S.C. 154(b) by 0 days.

(21) Appl. No.: 15/022,398

(22) PCT Filed: Sep. 19, 2014

(86) PCT No.: PCT/JP2014/074892
§ 371 (c)(1),
(2) Date: Mar. 16, 2016

(87) PCT Pub. No.: WO2015/041333
PCT Pub. Date: Mar. 26, 2015

(65) Prior Publication Data
US 2016/0221550 A1 Aug. 4, 2016

(30) Foreign Application Priority Data

Sep. 20, 2013 (JP) ................. 2013-195485

(51) Int. Cl.
*B60T 8/171* (2006.01)
*B60T 17/22* (2006.01)
(Continued)

(52) U.S. Cl.
CPC .............. *B60T 8/171* (2013.01); *B60T 7/042* (2013.01); *B60T 13/588* (2013.01);
(Continued)

(58) Field of Classification Search
None
See application file for complete search history.

(56) References Cited

U.S. PATENT DOCUMENTS

2004/0113486 A1* 6/2004 Koga ................ B60T 7/107
303/20
2005/0077783 A1* 4/2005 Suzuki ................ B60T 7/107
303/89
(Continued)

FOREIGN PATENT DOCUMENTS

JP H05-116613 A 5/1993
JP 2001-122107 A 5/2001
(Continued)

OTHER PUBLICATIONS

International Search Report (PCT/ISA/210) dated Dec. 22, 2014, by the Japanese Patent Office as the International Searching Authority for International Application No. PCT/JP2014/074892.
(Continued)

*Primary Examiner* — Rami Khatib
(74) *Attorney, Agent, or Firm* — Buchanan Ingersoll & Rooney PC

(57) ABSTRACT

A brake temperature detection device is configured detect brake temperature more accurately. In a situation in which the temperature in the vicinity of the brake has risen above the atmospheric temperature, indicated by a value read off of the detection signal of the temperature sensor, for example when traveling in congested traffic, a value to correct atmospheric temperature is determined, and atmospheric temperature is corrected on the basis of that atmospheric temperature correction value. Subsequently, brake temperature is calculated on the basis of the corrected air temperature. As a result of this configuration, it is possible to have the calculated brake temperature approach the actual brake (Continued)

temperature. This makes it possible to detect brake temperature more accurately.

6 Claims, 10 Drawing Sheets

(51) Int. Cl.

| | | |
|---|---|---|
| *G01K 11/00* | (2006.01) | |
| *G01K 13/00* | (2006.01) | |
| *B60T 7/04* | (2006.01) | |
| *B60T 13/58* | (2006.01) | |
| *B60T 13/74* | (2006.01) | |
| *G01K 7/42* | (2006.01) | |

(52) U.S. Cl.
CPC ............ *B60T 13/741* (2013.01); *B60T 17/22* (2013.01); *B60T 17/221* (2013.01); *G01K 7/427* (2013.01); *G01K 11/00* (2013.01); *G01K 13/00* (2013.01); *G01K 2205/00* (2013.01)

(56) References Cited

U.S. PATENT DOCUMENTS

| | | | | |
|---|---|---|---|---|
| 2007/0176489 | A1* | 8/2007 | Matsuura | .................. B60T 8/00 |
| | | | | 303/155 |
| 2009/0197738 | A1* | 8/2009 | Jackson | .................. B60T 7/122 |
| | | | | 477/188 |
| 2012/0089313 | A1* | 4/2012 | Frashure | .................. B60T 7/042 |
| | | | | 701/94 |
| 2013/0274970 | A1* | 10/2013 | Takahashi | ............. B60L 3/0076 |
| | | | | 701/22 |

FOREIGN PATENT DOCUMENTS

| | | |
|---|---|---|
| JP | 2006-298191 A | 11/2006 |
| JP | 2009-149256 A | 7/2009 |

OTHER PUBLICATIONS

Written Opinion (PCT/ISA/237) dated Dec. 22, 2014, by the Japanese Patent Office as the International Searching Authority for International Application No. PCT/JP2014/074892.

* cited by examiner

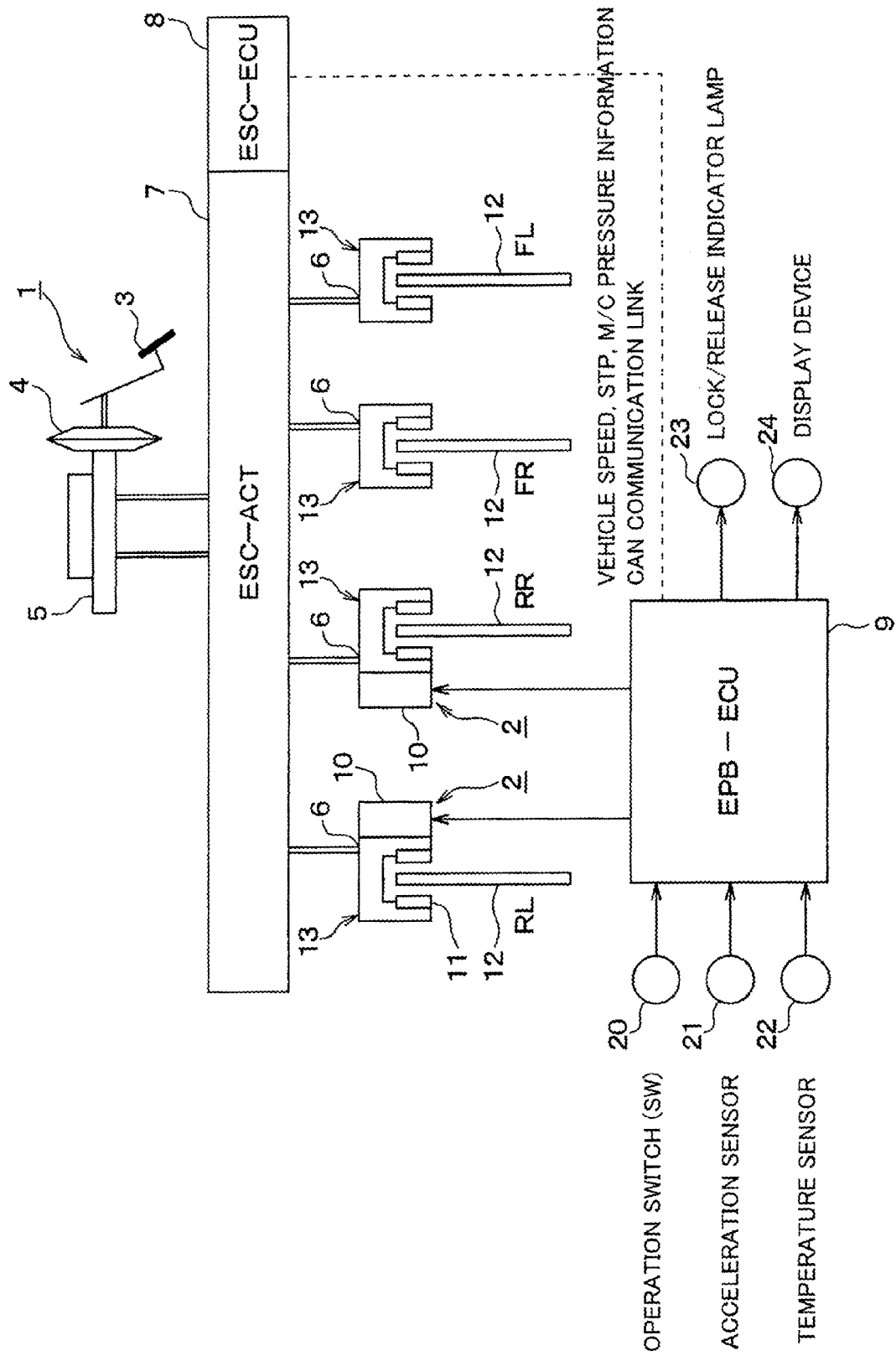
[FIG.1]

[FIG.2A]
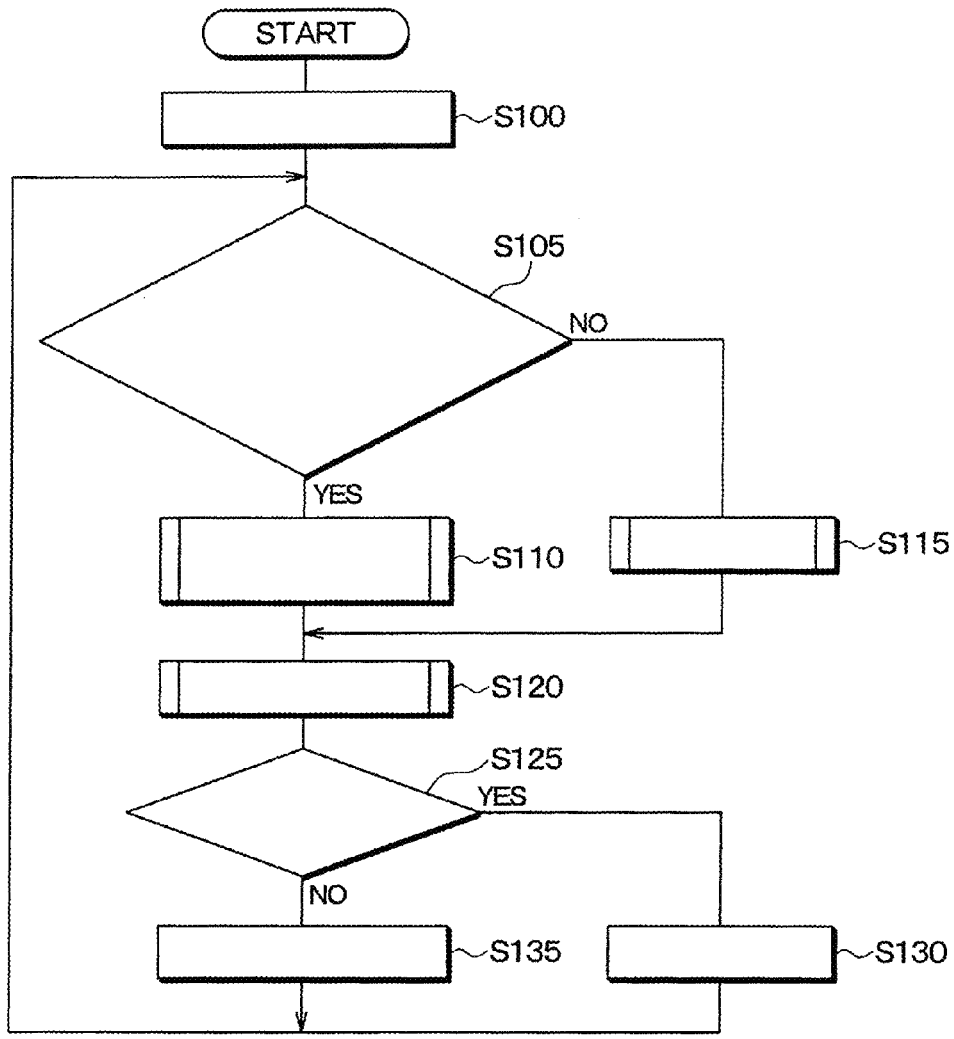
[FIG.2B]
S100 INITIALIZE
S105 STP = ON
     STP SWITCH IS NORMAL
     M/C PRESSURE > JUDGMENT THRESHOLD VALUE
     M/C PRESSURE IS EFFECTIVE
S110 CALCULATE THE AMOUNT OF INCREASE IN BRAKE TEMPERATURE IN BRAKING
S115 CALCULATE COOLING TEMPERATURE
S120 CALCULATE BRAKE TEMPERATURE
S125 BRAKE TEMPERATURE > FADE TEMPERATURE?
S135 RELEASE FADE WARNING
S130 ISSUE FADE WARNING

[FIG.3A]
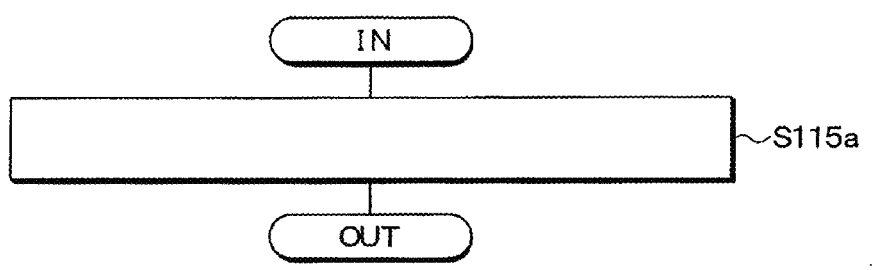
[FIG.3B]
S115a BRAKE COOLING TEMPERATURE (n) = ATMOSPHERIC TEMPERATURE + (BRAKE TEMPERATURE (n-1) - ATMOSPHERIC TEMPERATURE) COEFFICIENT OF COOLING

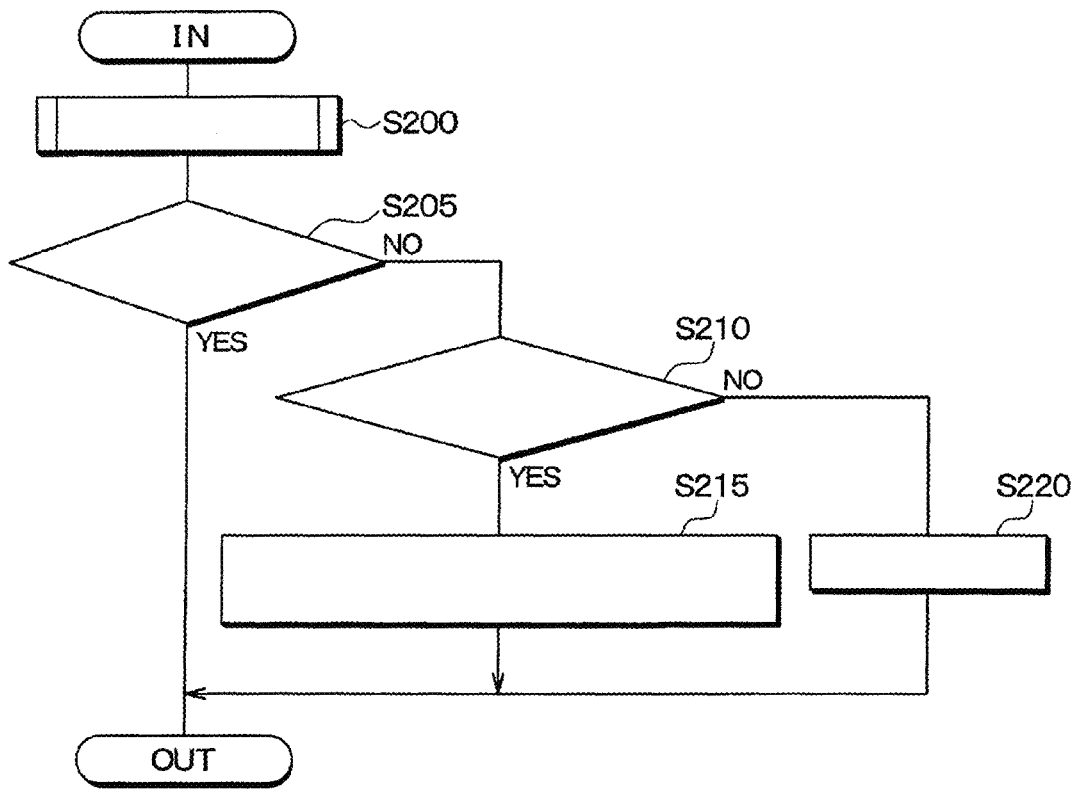
[FIG.4B]
S200  JUDGE TRAFFIC CONGESTION
S205  TRAFFIC CONGESTION JUDGMENT = OFF?
S210  TRAFFIC CONGESTION JUDGMENT = OFF ON?
S215  MIN (BRAKE TEMPERATURE (n − 1), ATMOSPHERIC TEMPERATURE = ATMOSPHERIC TEMPERATURE (READ-OFF VALUE) + ATMOSPHERIC TEMPERATURE CORRECTION VALUE)
S220  MAINTAIN PREVIOUS VALUE

[FIG.5A]

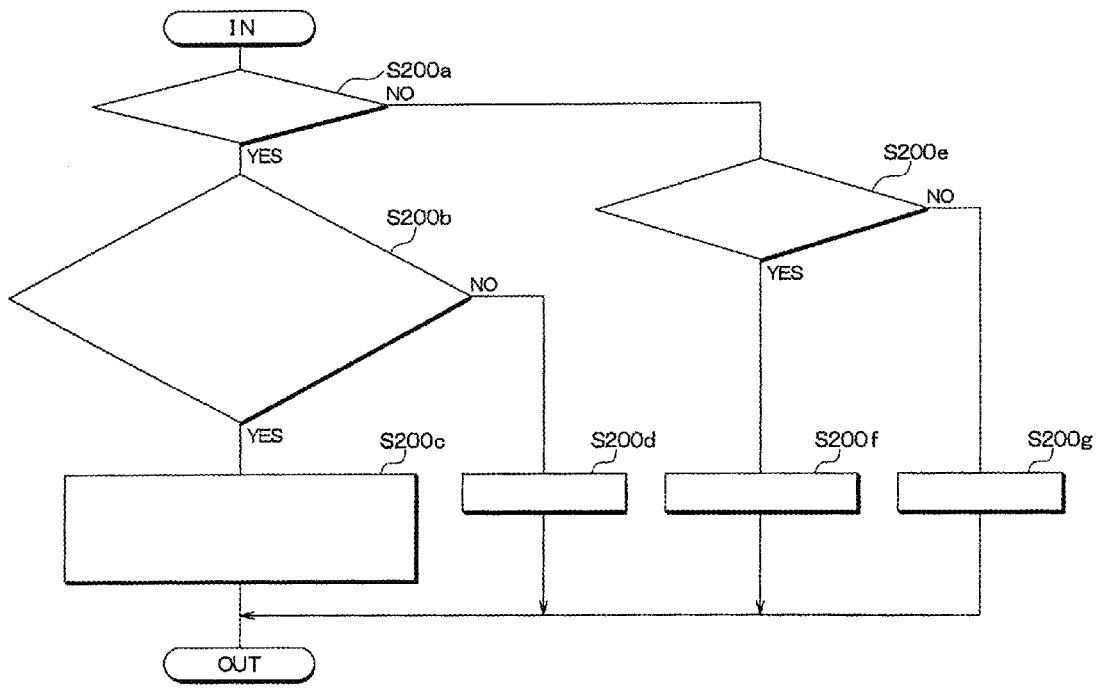

[FIG.5B]
S200a TRAFFIC CONGESTION JUDGMENT = OFF?
S200b VEHICLE SPEED LOW SPEED TRAVEL JUDGMENT THRESHOLD VALUE
[LOW SPEED TRAVEL JUDGMENT TIME – CONTINUES]
BRAKING LOAD BRAKING LOAD DURING LOW SPEED TRAVEL
[NUMBER OF BRAKING LOADS DURING LOW SPEED TRAVEL – CONTINUES]
S200c TRAFFIC CONGESTION JUDGMENT = ON
TRAFFIC CONGESTION LEVEL: DETERMINE FROM TRAFFIC CONGESTION LEVEL MAP
SET ATMOSPHERIC TEMPERATURE CORRECTION VALUE AND BRAKE TEMPERATURE
CORRECTION VALUE ACCORDING TO TRAFFIC CONGESTION LEVEL
S200d MAINTAIN PREVIOUS VALUE
S200e VEHICLE SPEED HIGH SPEED TRAVEL JUDGMENT THRESHOLD VALUE?
S200f TRAFFIC CONGESTION JUDGMENT = OFF
S200g MAINTAIN PREVIOUS VALUE

[FIG.6]
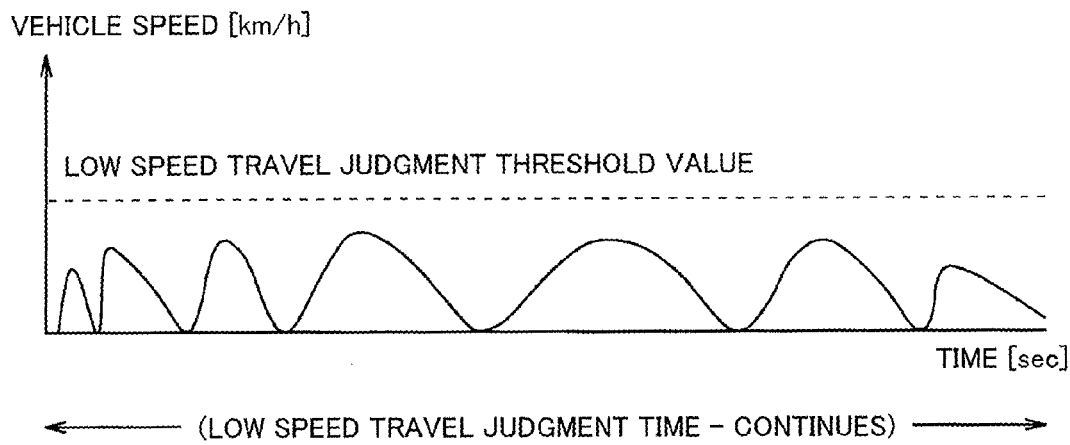
[FIG.7]
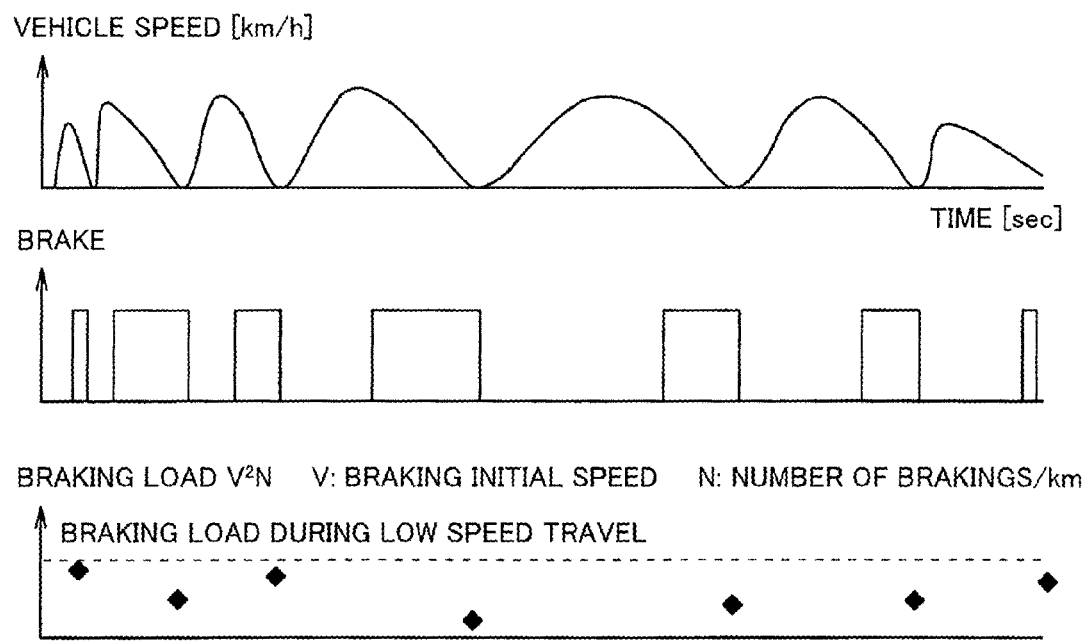

[FIG.8]

LOW SPEED TRAVEL JUDGMENT THRESHOLD VALUE [km/h]

|     | 5 | 10 | 15 | 20 |
|-----|---|----|----|----|
| 5   | 1 | 0  | 0  | 0  |
| 10  | 2 | 1  | 0  | 0  |
| 15  | 3 | 2  | 1  | 0  |
| 20  | 4 | 3  | 2  | 1  |
| 30  | 5 | 4  | 3  | 2  |

LOW SPEED TRAVEL JUDGMENT TIME [min]

[FIG.9]

BRAKING LOAD DURING LOW SPEED TRAVEL [V²N]

|     | 30 | 50 | 80 | 150 |
|-----|----|----|----|-----|
| 3   | 1  | 0  | 0  | 0   |
| 5   | 2  | 1  | 0  | 0   |
| 10  | 3  | 2  | 1  | 0   |
| 15  | 4  | 3  | 2  | 1   |
| 20  | 5  | 4  | 3  | 2   |

NUMBER OF BRAKING LOADS DURING LOW SPEED TRAVEL [NUMBER OF COUNTS]

[FIG.10]

TRAFFIC CONGESTION LEVEL

|   | 0 | 1 | 2 | 3  | 4  | 5  |
|---|---|---|---|----|----|----|
|   | 0 | 3 | 6 | 10 | 20 | 30 |
|   | 0 | 3 | 6 | 10 | 20 | 30 |

BRAKE TEMPERATURE CORRECTION VALUE [°C]
ATMOSPHERIC TEMPERATURE CORRECTION VALUE [°C]

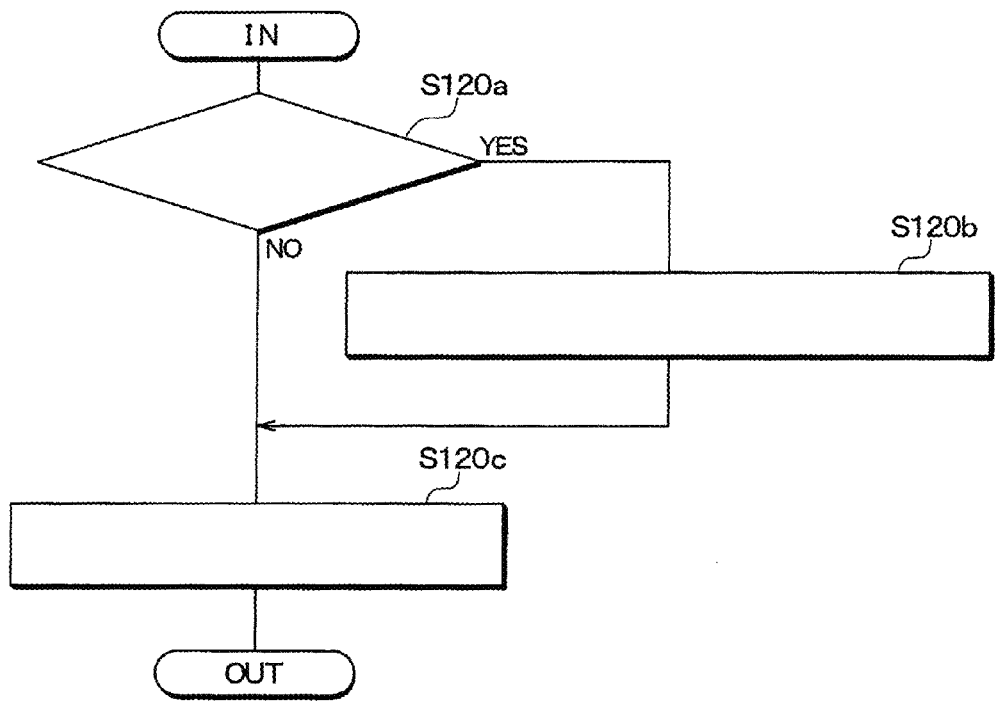
[FIG.11A]
[FIG.11B]
S120a TRAFFIC CONGESTION TRAVEL JUDGMENT = OFF ON?
S120b MIN (WHEEL HOUSE TEMPERATURE UPPER LIMIT VALUE, BRAKE COOLING
 TEMPERATURE = BRAKE COOLING TEMPERATURE + BRAKE TEMPERATURE
 CORRECTION VALUE)
S120c BRAKE TEMPERATURE = THE AMOUNT OF INCREASE IN BRAKE TEMPERATURE IN
 BRAKING + BRAKE COOLING TEMPERATURE

[FIG.12]
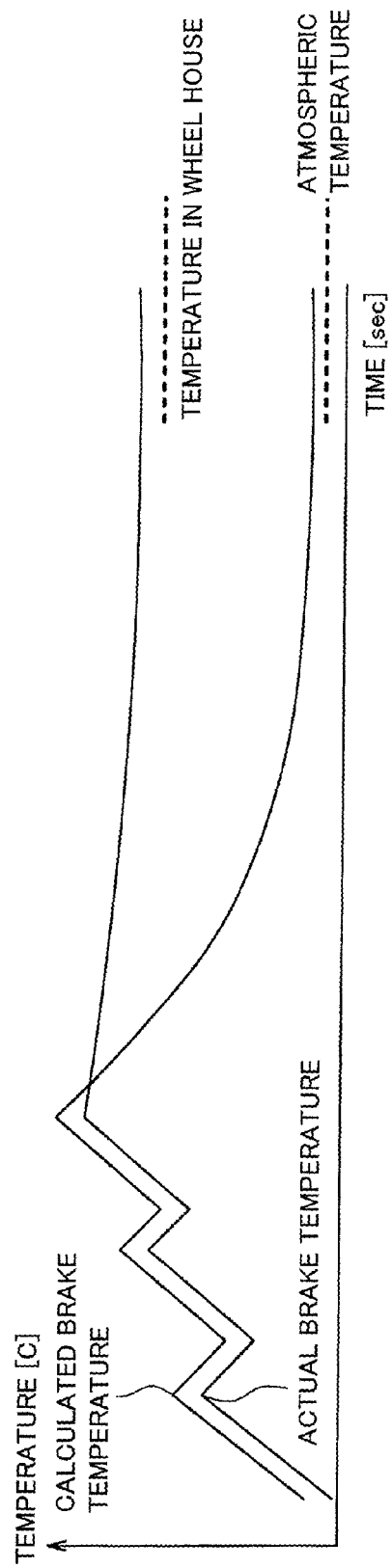

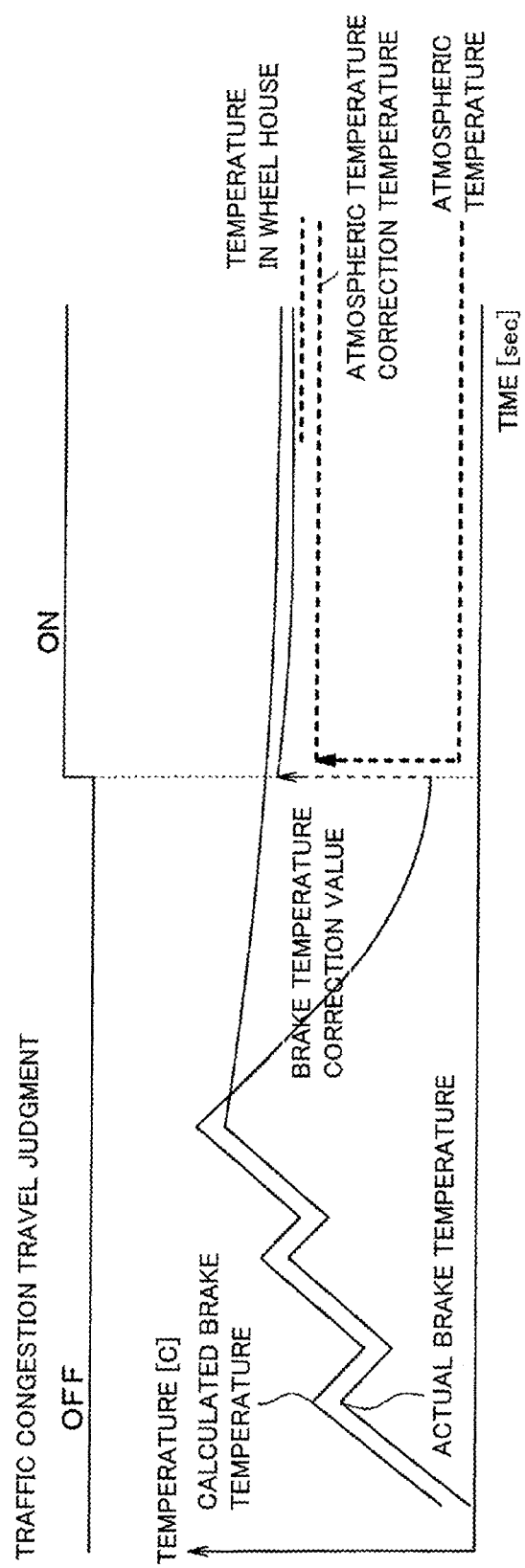
[FIG.13]

BRAKE TEMPERATURE DETECTION DEVICE AND ELECTRIC PARKING BRAKE CONTROL DEVICE

TECHNICAL FIELD

The present invention relates to a brake temperature detection device capable of accurately detecting a brake temperature and to an electric parking brake control device for controlling an electric parking brake (hereinafter referred to as the EPB) in accordance with the brake temperature.

BACKGROUND ART

A fade warning generation device for exercising control in accordance with a brake temperature, which is known in the art, is proposed in Patent Literature 1. The device calculates the amount of brake heat that corresponds to a brake temperature, and issues a fade warning in accordance with the calculated amount of brake heat to warn that brake fade has occurred. The device executes a temperature calculation process for calculating a brake temperature by calculating the amount of increase in brake temperature by braking and a temperature of a brake cooled by natural cooling (hereinafter, called the brake cooling temperature), and issues the fade warning in accordance with the brake temperature.

More specifically, the relationship between kinetic energy of a running vehicle and the amount of heat assumed when the kinetic energy is converted into a braking force is predetermined, and then, the amount of increase in brake temperature in braking is determined by converting the kinetic energy of the vehicle into the amount of heat. In addition, the brake cooling temperature is determined in accordance with the difference between an atmospheric temperature and the previous brake temperature. A brake temperature is determined in accordance with the calculated amount of increase in brake temperature and the calculated brake cooling temperature. When the brake temperature is equal to or more than a fade temperature, it is judged that brake fade has occurred. Further, when the deceleration of the vehicle (hereinafter simply referred to as the deceleration), which is calculated from the speed of the vehicle, is lower than an expected deceleration value calculated from a master cylinder (hereinafter referred to as the M/C) pressure at a time of braking, the fade warning is issued because it is judged that the braking effect is reduced.

CITATIONS LIST

Patent Literature

Patent Literature 1: Japanese Patent Application Laid-Open (JP-A) No. 2001-122107

SUMMARY OF INVENTION

Technical Problems

However, a temperature sensor, which detects the atmospheric temperature used for calculating the brake cooling temperature, is arranged in a place where the atmospheric temperature can be detected more accurately, e.g., in an engine room, in the vehicle. Consequently, in a situation in which the temperature in a wheel house of the vehicle rises, for example, during travel in congested traffic, the temperature in the vicinity of the brake rises above the atmospheric temperature indicated by the readings indicative of the detection signal of the temperature sensor. This causes the brake cooling temperature to be calculated in accordance with the atmospheric temperature lower than the actual temperature in the vicinity of the brake. Due to this, the judgment can be erroneous, which cannot issue the fade warning although brake fade has occurred.

In light of the foregoing, it is an object of the present invention to provide a brake temperature detection device capable of detecting a brake temperature more accurately and an EPB control device capable of controlling an EPB in accordance with the accurate brake temperature.

Solutions to Problems

In order to achieve the above object, an invention of a first aspect provides a brake temperature detection device for detecting a brake temperature in each control cycle including means that calculates the amount of increase in brake temperature when a vehicle is braked, cooling temperature calculation means that calculates a brake cooling temperature in accordance with the difference between an atmospheric temperature indicated by a readings indicative of the detection signal of a temperature sensor provided in the vehicle and a brake temperature detected in the previous control cycle when the vehicle is not braked, the brake cooling temperature being a temperature of the brake cooled by natural cooling, brake temperature calculation means that detects a brake temperature in the present control cycle by adding the amount of increase in brake temperature to the brake cooling temperature, and temperature rise judgment means that judges whether the temperature in a wheel house in the vehicle has risen above the atmospheric temperature indicated by the readings indicative of the detection signal of the temperature sensor, in which when the temperature rise judgment means judges that the temperature in the wheel house has risen above the atmospheric temperature indicated by the readings indicative of the detection signal of the temperature sensor, the cooling temperature calculation means corrects the atmospheric temperature by adding an atmospheric temperature correction value to the atmospheric temperature indicated by the readings indicative of the detection signal of the temperature sensor, and uses the corrected atmospheric temperature to calculate the brake cooling temperature.

As described above, in a situation in which the temperature in the vicinity of the brake has risen above the atmospheric temperature indicated by the readings indicative of the detection signal of the temperature sensor, for example, during travel in congested traffic, the atmospheric temperature correction value is determined, and then, the atmospheric temperature is corrected in accordance with the atmospheric temperature correction value. Subsequently, the brake temperature is calculated in accordance with the corrected atmospheric temperature. Therefore, the calculated brake temperature can be brought closer to an actual brake temperature, and the brake temperature can be detected more accurately.

In an invention of a second aspect, when the temperature rise judgment means judges that the temperature in the wheel house has risen above the atmospheric temperature indicated by the readings indicative of the detection signal of the temperature sensor, the cooling temperature calculation means corrects the brake cooling temperature by adding a brake temperature correction value to the brake cooling temperature, and the brake temperature calculation means uses the corrected brake cooling temperature to detect the brake temperature.

With this, even when the brake temperature calculated during the time before the result of the judgment is obtained deviates from the actual brake temperature, the brake temperature is determined in consideration of the brake temperature correction value when it is judged that the temperature in the wheel house has risen above the atmospheric temperature indicated by the readings indicative of the detection signal of the temperature sensor. Therefore, after the judgment, the calculated brake temperature can be substantially equal to the actual brake temperature.

In an invention of a third aspect, the temperature rise judgment means judges that the temperature in the wheel house has risen above the atmospheric temperature indicated by the readings indicative of the detection signal of the temperature sensor when the vehicle is traveling in congested traffic, and corrects the atmospheric temperature to a value higher than the atmospheric temperature indicated by the readings indicative of the detection signal of the temperature sensor.

As described above, the temperature rise judgment means can judge that the temperature in the wheel house has risen above the atmospheric temperature indicated by the readings indicative of the detection signal of the temperature sensor, for example, when the vehicle is traveling in congested traffic. In this case, the atmospheric temperature is corrected so as to be higher than the atmospheric temperature indicated by the readings indicative of the detection signal of the temperature sensor. Therefore, the effect of the first aspect can be obtained.

In an invention of a fourth aspect, the brake temperature detection device further has traffic congestion level judgment means that judges a traffic congestion level indicating the degree of traffic congestion, in which either or both of the atmospheric temperature correction value and the brake temperature correction value are set to be larger as the traffic congestion level is higher.

As described above, either or both of the atmospheric temperature correction value and the brake temperature correction value are set to be larger as the traffic congestion level is higher. Therefore, the atmospheric temperature correction value either or both the brake temperature correction value can be set according to the degree of the temperature rise in the wheel house.

In an invention of a fifth aspect, the traffic congestion level judgment means has a plurality of low speed travel judgment threshold values each of which is a threshold value to be compared with a vehicle speed of the vehicle, and a plurality of low speed travel judgment times each of which is a threshold value to be compared with a continuation time in which the vehicle speed is equal to or less than the low speed travel judgment threshold value, and can judge that the traffic congestion level is higher as the vehicle speed is equal to or less than the lower one among the low speed travel judgment threshold values or as the continuation time is equal to or more than the longer one among the low speed travel judgment times.

In an invention of a sixth aspect, the traffic congestion level judgment means has a plurality of braking loads during low speed travel each of which is a threshold value to be compared with a braking load represented by a braking initial speed being the vehicle speed at the start of braking and the number of brakings per predetermined distance, and a plurality of the numbers of braking loads during low speed travel each of which is a threshold value to be compared with the number of braking loads equal to or less than the braking load during low speed travel, and can judge that the traffic congestion level is higher as the braking load is equal to or less than the smaller one among the braking loads during low speed travel or as the number of braking loads equal to or less than the braking load during low speed travel is equal to or more than the larger one among the numbers of braking loads during low speed travel.

In an invention of a seventh aspect, an electric parking brake control device has lock control means that executes lock control by driving a motor to generate a pressing force and let an electric parking brake generate a braking force, stopping the drive of the motor when the braking force reaches a target braking force, and maintaining the braking force to achieve a locked state, in which the lock control means sets a timing of ending the lock control or the control count of the lock control in accordance with the brake temperature detected by the brake temperature detection device of any one of the first to sixth aspects.

As described above, the control timing of the lock control or the control count of the lock control is set in accordance with the calculated brake temperature. Therefore, even if heat slack occurs, it is possible to generate a desired braking force that is adequate for keeping the vehicle parked.

BRIEF DESCRIPTION OF DRAWINGS

FIG. 1 is a schematic diagram illustrating an overview of a vehicle brake system to which an EPB control device according to a first embodiment of the present invention is applied.

FIG. 2A is a flowchart illustrating in detail a fade warning process based on the result of brake temperature detection.

FIG. 2B is a caption of FIG. 2A.

FIG. 3A is a flowchart illustrating in detail a cooling temperature calculation process.

FIG. 3B is a caption of FIG. 3A.

FIG. 4A is a flowchart illustrating in detail an atmospheric temperature correction calculation process.

FIG. 4B is a caption of FIG. 4A.

FIG. 5A is a flowchart illustrating in detail a traffic congestion judgment process.

FIG. 5B is a caption of FIG. 5A.

FIG. 6 is a time chart illustrating the relationship between a low speed travel judgment threshold value and a vehicle speed.

FIG. 7 is a time chart illustrating the relationship between a braking operation, a vehicle speed, and a braking load calculation timing.

FIG. 8 is a map illustrating an example of the relationships between low speed travel judgment threshold values, low speed travel judgment times, and traffic congestion levels.

FIG. 9 is a map illustrating an example of the relationships between braking loads during low speed travel, the numbers of braking loads during low speed travel, and traffic congestion levels.

FIG. 10 is a map illustrating the relationships between traffic congestion levels, atmospheric temperature correction values, and brake temperature correction values.

FIG. 11A is a flowchart illustrating in detail a brake temperature calculation process.

FIG. 11B is a caption of FIG. 11A.

FIG. 12 is a time chart in which the atmospheric temperature correction calculation process is not executed during travel in congested traffic.

FIG. 13 is a time chart in which the atmospheric temperature correction calculation process is executed during travel in congested traffic.

DESCRIPTION OF EMBODIMENTS

Embodiments of the present invention will now be described with reference to the drawings. In the embodiments below, portions identical or equivalent to each other are designated by the same reference numerals.

First Embodiment

A first embodiment of the present invention will now be described. In the description of the present embodiment, a vehicle brake system in which a disk brake type EPB is applied to a rear wheel system will be explained as an example. FIG. 1 is a schematic diagram illustrating an overview of the vehicle brake system to which an EPB control device including a brake temperature detection device according to the present embodiment is applied. The following description will be given with reference to FIG. 1.

As illustrated in FIG. 1, the brake system includes a service brake 1 and an EPB 2. The service brake 1 generates a braking force in accordance with a brake pedal force applied by a driver. The EPB 2 locks the wheels of a vehicle to prevent the vehicle from moving while the vehicle is parked.

The service brake 1 generates a braking force by causing a brake booster 4 to boost the brake pedal force applied by the driver when the driver steps on a brake pedal 3, generating a brake fluid pressure within a master cylinder (M/C) 5 in accordance with the boosted brake pedal force, and transmitting the brake fluid pressure to a wheel cylinder (hereinafter referred to as the W/C) 6 included in a brake mechanism for each wheel. An actuator 7 for adjusting the brake fluid pressure is disposed between the M/C 5 and the W/C 6. The actuator 7 is structured to be able to adjust the braking force generated by the service brake 1 and perform various control functions (such as an ABS control function) for the purpose of enhancing the safety of the vehicle.

Various control functions provided by the actuator 7 are executed by an ESC (Electronic Stability Control)-ECU 8. For example, the ESC-ECU 8 controls a brake fluid pressure circuit included in the actuator 7 to control a W/C pressure by outputting a control current for controlling various control valves and a pump drive motor, which are included in the actuator 7. When, for instance, normal braking is applied, the actuator 7 transmits an M/C pressure generated in the M/C 5 to the W/C 6 as is. However, when, for instance, ABS control is exercised, the actuator 7 controls the on/off of various control valves and controls the pump drive motor to increase or decrease the W/C pressure, thereby preventing the wheels from being locked. Further, the actuator 7 can automatically apply the W/C pressure by driving the various control valves and the pump drive motor. When the M/C pressure is not generated or when a W/C pressure higher than the M/C pressure is to be generated, the actuator 7 can generate a high braking force in accordance with an automatic pressurization function. The structure of the actuator 7 has been well known and will not be described in detail. However, the actuator 7 includes, for example, various control valves, various pumps, and a pump drive motor.

Meanwhile, the EPB 2 is controlled by an EPB control device (hereinafter referred to as the EPB-ECU) 9. The EPB-ECU 9 drives a motor 10 to control the brake mechanism, thereby generating a braking force.

The EPB-ECU 9 includes a well-known microcomputer having, for example, a CPU, a ROM, a RAM, and an I/O device. In accordance with a program stored, for instance, in the ROM, the EPB-ECU 9 controls the rotation of the motor 10 to provide parking brake control, such as lock control and release control, and a fade warning process. In an occasion of the lock control, the motor 10 is driven to generate a pressing force that presses a brake pad 11 against a brake disc 12. This causes the EPB 2 to generate a braking force. When the braking force reaches a target braking force, the drive of the motor 10 is stopped so that the braking force is maintained to achieve a locked state. In an occasion of the release control, the motor 10 is driven in a direction opposite to the direction in which the motor 10 is driven to exercise the lock control. This releases the pressing force that presses the brake pad 11 against the brake disc 12. When the brake pad 11 is separated a predetermined distance from the brake disc 12, the drive of the motor 10 is stopped to achieve a released state. In an occasion of the fade warning process, a brake temperature is detected, it is judged whether brake fade has occurred in accordance with the brake temperature, and when it is judged that brake fade has occurred, a fade warning is issued. The portion of the EPB-ECU 9, which detects the brake temperature in the fade warning process, structures the brake temperature detection device of the present invention.

The EPB-ECU 9 and the ESC-ECU 8 exchange information with each other through a CAN communication link, which provides an in-vehicle LAN. When exercising parking brake control, the EPB-ECU 9 acquires, for example, vehicle speed information, STP information indicative of the status of a stop lamp switch (hereinafter referred to as the STP), and M/C pressure information, which are handled by the ESC-ECU 8. The ESC-ECU 8 acquires detection signals from a wheel speed sensor, the STP, and an M/C pressure sensor, which are not illustrated, and acquires the vehicle speed information, the STP information, and the M/C pressure information in accordance with the detection signals. Hence, these pieces of information are conveyed to the EPB-ECU 9 through the CAN communication link.

Further, the EPB-ECU 9 inputs, for example, a signal indicative of the operating state of an operation switch (SW) 20 mounted on an instrument panel (not shown) in a vehicle compartment and the detection signal of an acceleration sensor 21 for detecting the longitudinal acceleration of the vehicle, and drives the motor 10 in accordance, for instance, with the operating state of the operation switch (SW) 20 and with the longitudinal acceleration of the vehicle. Furthermore, the EPB-ECU 9 outputs a signal indicative of the locked state or the released state to a lock/release indicator lamp 23 mounted on the instrument panel. When a failure of the EPB 2 is detected or the fade warning is generated, the EPB-ECU 9 outputs a signal indicative of such a condition to a display device 24.

More specifically, the EPB-ECU 9 includes various functional sections for performing parking brake control functions such as a motor current detection function of detecting a current flowing in the motor 10 (a motor current) either upstream or downstream of the motor 10, a target motor current calculation function of calculating a target motor current (target current value) for terminating the lock control, a function of judging whether the motor current has reached the target motor current, and a function of controlling the EPB 2 in accordance with the operating state of the operation switch (SW) 20. The EPB-ECU 9 controls the EPB 2 by rotating the motor 10 in a normal direction or in a reverse direction or stopping the rotation of the motor 10 in accordance with the status of the operation switch (SW) 20 and with the motor current.

The brake mechanism provided for each wheel has a mechanical structure for generating a braking force in the brake system according to the present embodiment. The brake mechanism for a front wheel system is structured to generate a braking force when the service brake 1 is operated. However, the brake mechanism for the rear wheel system is commonly structured to generate a braking force when either the service brake 1 or the EPB 2 is operated. Unlike the brake mechanism for the rear wheel system, the brake mechanism for the front wheel system is a brake mechanism that has been generally used in which a mechanism for generating a braking force in accordance with the operation of the EPB 2 is eliminated.

The brake mechanism for the front wheel system, which generates a braking force in accordance with the operation of the service brake 1, has been generally used. The brake mechanism for the rear wheel system, which generates a braking force in accordance with the operations of the service brake 1 and the EPB 2, is also made well known, for instance, by Japanese Patent Application Laid-Open (JP-A) No. 2010-58536. Therefore, the structures of these brake mechanisms will not be described in detail here.

The fade warning process and parking brake control, which the EPB-ECU 9 provides by using the vehicle brake system configured as described above and by using the various functional sections and the program stored in the built-in ROM (not shown), will now be described. However, a normal process for exercising the lock control and the release control, which is performed within a parking brake control process, is the same as a previously performed process. Therefore, a fade warning process based on brake temperature detection and a lock control method based on brake temperature detection, which are peculiar to the present invention, will be described below.

FIG. 2A and FIG. 2B is a flowchart illustrating in detail the fade warning process based on the result of brake temperature detection. The fade warning process is performed in each predetermined control cycle while, for instance, an ignition switch (hereinafter referred to as the IG) is turned on to activate the EPB-ECU 9.

In the fade warning process, a brake temperature is detected by calculating the amount of increase in brake temperature and a brake cooling temperature, and the fade warning is issued in accordance with the detected brake temperature. Further, as the brake temperature detection is achieved in the fade warning process, the result of the brake temperature detection is used to determine the pressing force for pressing the brake pad 11 against the brake disc 12 during the lock control.

The amount of increase in brake temperature represents the amount of increase in the temperature of the brake mechanism in each control cycle, or more specifically, the amount of increase in the temperature of the brake pad 11 in each control cycle. The brake cooling temperature represents the temperature of the brake mechanism cooled in the each control cycle, or more specifically, the temperature of the brake pad 11 in the each control cycle. Hence, the brake temperature is determined by adding the amount of increase in brake temperature to the brake cooling temperature.

As illustrated in FIG. 2A and FIG. 2B, first of all, in step 100, a normal initialization process is performed, for instance, to reset a flag and reset a stored value. Upon completion of step 100, processing proceeds to step 105. In step 105, a braking judgment process judges whether braking is in progress. The present embodiment also judges whether sensors used for the braking judgment process are normal. More specifically, step 105 is performed to (1) determine whether the STP is turned on and normal, (2) determine whether the M/C pressure is higher than a judgment threshold value for assuming that the brake pedal 3 is depressed and whether the M/C pressure is effective, and determine whether at least one of conditions (1) and (2) is established. These judgment sequences are performed in accordance with information that the EPB-ECU 9 has acquired from the ESC-ECU 8.

An alternative is to perform judgment sequence (1) only or judgment sequence (2) only. Another alternative is to complete step 105 without judging whether the STP is normal and whether the M/C pressure is effective. In the present embodiment, however, all the above-mentioned judgment sequences are performed for the sake of redundancy.

If, in step 105, it is judged as YES, processing proceeds to step 110. In step 110, a process for calculating the amount of increase in brake temperature in braking is performed. The amount of increase in brake temperature can be calculated by a well-known method. For example, the amount of increase in brake temperature based on kinetic energy and the amount of increase in brake temperature based on braking energy are calculated and are combined, thereby obtaining the final amount of increase in brake temperature.

The amount of increase in brake temperature based on kinetic energy is the amount of increase in heat that is assumed to be generated on the brake when the kinetic energy generated in the vehicle is converted into a braking force. For example, the relationship between kinetic energy generated in the vehicle and the amount of heat that is assumed to be generated when the kinetic energy is converted into a braking force is predetermined. The amount of increase in brake temperature based on kinetic energy is then determined by converting the vehicle's kinetic energy into the amount of heat. When the weight of the vehicle is m and the speed of the vehicle is v, the kinetic energy generated in the vehicle can be expressed as $\frac{1}{2} \times m v^2$. Therefore, the EPB-ECU 9 determines the kinetic energy by acquiring the vehicle speed information from the ESC-ECU 8, and derives the amount of increase in brake temperature corresponding to the determined kinetic energy from the predetermined relationship.

The amount of increase in brake temperature based on braking energy is the amount of increase in heat that is possibly derived from energy produced when the vehicle is decelerated by braking, that is, the amount of increase in heat that is calculated from the amount of work done when the brake pad 11, which is a friction material, is pressed against the brake disc 12, which is a friction target material. For example, the relationship between energy consumed by a braking force when the vehicle is decelerated by braking and the amount of heat possibly derived from that energy is predetermined. Further, the amount of increase in brake temperature based on braking energy is determined by converting the vehicle's braking energy into the amount of heat. The braking energy is the product of the W/C pressure, that is, the pressing force for pressing the brake pad 11 against the brake disc 12, and the number of wheel revolutions made during braking, that is, a braking distance. Therefore, the EPB-ECU 9 acquires the vehicle speed information from the ESC-ECU 8, determines the braking energy from the M/C pressure information, and derives the amount of increase in brake temperature corresponding to the determined braking energy from the predetermined relationship.

Either one of the amount of increase in brake temperature based on kinetic energy and the amount of increase in brake temperature based on braking energy may be used. The amount of increase in brake temperature based on kinetic energy is basically accurate. However, the amount of increase in brake temperature based on braking energy is not as accurate as the amount of increase in brake temperature based on kinetic energy. This is because the amount of increase in brake temperature based on braking energy is a value calculated in accordance with the braking distance and the W/C pressure, but the coefficient of friction between the brake pad 11 and the brake disc 12, which is included in an arithmetic expression, is likely to vary with the environment (for example, the ambient temperature and humidity).

Basically, the amount of increase in brake temperature based on kinetic energy is more accurate than the amount of increase in brake temperature based on braking energy as described above. It is therefore preferred that the amount of increase in brake temperature based on kinetic energy be used. However, the amount of increase in brake temperature based on kinetic energy is erroneous due to the influence of gravitational acceleration according to the gradient of a sloped road surface when the vehicle is running on the sloped road surface. In such a situation, the amount of increase in brake temperature based on braking energy may more accurately represent the amount of increase in brake temperature than the amount of increase in brake temperature based on kinetic energy. The gradient of the sloped road surface is determined by a well-known method in accordance with vehicle acceleration as the differential value of the vehicle speed and the detection signal of the acceleration sensor 21. This makes it possible to select the amount of increase in brake temperature based on kinetic energy or the amount of increase in brake temperature based on braking energy, whichever is more appropriate, in accordance with the determined gradient of the sloped road surface.

If, in step 105, it is judged as NO, processing proceeds to step 115. In step 115, a brake cooling temperature is calculated by a cooling temperature calculation process. FIG. 3A and FIG. 3B is a flowchart illustrating in detail the cooling temperature calculation process.

As shown in FIG. 3A and FIG. 3B, in step 115a, a brake cooling temperature (n) in the present control cycle is calculated by adding, to an atmospheric temperature, a value obtained by multiplying the difference between a brake temperature (n−1) in the previous control cycle and the atmospheric temperature by the coefficient of cooling. When the vehicle is not under braking, the brake is cooled because no friction by braking occurs between the brake pad 11 and the brake disc 12. A temperature decrease caused by cooling is calculated in accordance with Newton's law of cooling, which states that the rate of cooling is proportional to the difference between the brake temperature and the temperature in the vicinity of the brake. Hence, the brake cooling temperature (n) in the present control cycle is calculated based on the equation expressed in step 115a.

When the vehicle is traveling in congested traffic, the temperature in a wheel house rises, and the temperature in the vicinity of the brake rises above an atmospheric temperature indicated by the readings indicative of the detection signal of the temperature sensor 22. Consequently, an atmospheric temperature correction calculation process is executed, and the cooling temperature calculation process is executed in accordance with an atmospheric temperature corrected by the atmospheric temperature correction calculation process.

FIG. 4A and FIG. 4B is a flowchart illustrating in detail the atmospheric temperature correction calculation process. The atmospheric temperature correction calculation process may be incorporated into the flowchart illustrated in FIG. 2A and FIG. 2B. However, in the present embodiment, the atmospheric temperature correction calculation process is executed in another flow, for example, the corrected atmospheric temperature is inputted by timer interruption, and is used for calculating the brake cooling temperature in the cooling temperature calculation process. Before the description of the cooling temperature calculation process, the atmospheric temperature correction calculation process will be described in detail.

In the atmospheric temperature correction calculation process, the atmospheric temperature indicated by the readings indicative of the detection signal of the temperature sensor 22 provided in the vehicle is corrected. Thus, the atmospheric temperature used for calculating the brake cooling temperature in the cooling temperature calculation process is brought closer to the temperature in the vicinity of the brake.

As illustrated in step 200 in FIG. 4A and FIG. 4B, a traffic congestion judgment process is executed. The traffic congestion judgment process judges whether the vehicle is traveling in congested traffic. When the vehicle is traveling in congested traffic, it is assumed that the temperature in the vicinity of the brake rises. Consequently, when it is judged that the vehicle is traveling in congested traffic, the atmospheric temperature is corrected. Here, in a situation in which the temperature in the vicinity of the brake has risen above the atmospheric temperature indicated by the readings indicative of the detection signal of the temperature sensor 22, the vehicle is traveling in congested traffic. However, the vehicle is not always required to be traveling in congested traffic. An alternative traveling state, e.g., a state in which the vehicle is traveling at low speed, corresponds to the situation in which the temperature in the vicinity of the brake has risen above the atmospheric temperature indicated by the readings indicative of the detection signal of the temperature sensor 22, as long as the above state is matched with the judgment conditions in the following traffic congestion judgment process.

FIG. 5A and FIG. 5B is a flowchart illustrating in detail the traffic congestion judgment process. As illustrated in step 200a in FIG. 5A and FIG. 5B, first, the traffic congestion judgment process judges whether the traffic congestion judgment is OFF, for example, whether a flag indicating the result of the traffic congestion judgment is reset. If the previous traffic congestion judgment process judges that the vehicle is traveling in congested traffic, the traffic congestion judgment is ON. If not, the traffic congestion judgment is OFF. If the traffic congestion judgment is OFF, processing proceeds to step 200b. In step 200b, it is judged whether the vehicle is traveling in congested traffic.

More specifically, it is judged that the vehicle is traveling in congested traffic, when a state in which a vehicle speed is equal to or less than a low speed travel judgment threshold value continues for a low speed travel judgment time, or when a state in which a braking load is equal to or less than a braking load during low speed travel continues the number of braking loads during low speed travel.

The low speed travel judgment threshold value and the low speed travel judgment time are threshold values used for judging whether the vehicle is traveling at low speed. The low speed travel judgment threshold value is a speed threshold value to be compared with the vehicle speed. The low speed travel judgment time is a time threshold value to be compared with a time in which the vehicle speed which is equal to or less than the low speed travel judgment threshold value continues. FIG. 6 illustrates a time chart illustrating the relationship between the low speed travel judgment threshold value and the vehicle speed. As illustrated in FIG. 6, when a state in which the vehicle speed is equal to or less than the low speed travel judgment threshold value continues for the low speed travel judgment time, it is judged that the vehicle is traveling in congested traffic because a state in which the vehicle is traveling at low speed continues for a relatively long time. In addition, a plurality of low speed travel judgment threshold values and a plurality of low speed travel judgment times may be set. For example, the relationships between the low speed travel judgment threshold values and the low speed travel judgment times may be shown in a map, and when the conditions shown in the relationships are met, it is judged that the vehicle is traveling in congested traffic.

The braking load means a load which is applied to the brake mechanism by braking. When the initial speed of braking which is the speed of the vehicle at the start of braking is V and the number of brakings per predetermined distance (e.g., 1 km) is N, the braking load is expressed as V2N. Consequently, the braking load becomes larger as the vehicle speed is higher and as the number of brakings is larger. The braking load during low speed travel means a braking load which is assumed to be applied while the vehicle is traveling at low speed. In the present embodiment, the braking load during low speed travel is used as a threshold value for judging whether the vehicle is traveling at low speed. The braking for stopping the vehicle is weaker during travel at low speed than during travel at high speed. Consequently, it is assumed that the braking load is small. The number of braking loads during low speed travel is a threshold value for judging whether the vehicle is traveling at low speed in congested traffic. That is, the number of braking loads during low speed travel is used for judging that the vehicle is traveling in congested traffic when a calculated braking load is continuously equal to or less than the braking load during low speed travel.

FIG. 7 illustrates a time chart illustrating the relationship between the braking operation, the vehicle speed, and the braking load calculation timing. For example, as illustrated in FIG. 7, the braking load is calculated each time the braking operation is performed once and the vehicle is then stopped. When the braking distance from the start of braking to the stop of the vehicle is e.g., 20 m, the number of brakings per 20 m is assumed to be one. When the braking distance is converted into 1 km, the number of brakings per 1 km is 50. When the braking load is calculated for each braking and a state in which the calculated braking load is equal to or less than the braking load during low speed travel continues the number of braking loads during low speed travel or more, it is judged that the vehicle is traveling in congested traffic. A plurality of braking loads during low speed travel and a plurality of the numbers of braking loads during low speed travel may be used. For example, the relationship between the braking loads during low speed travel and the numbers of braking loads during low speed travel may be shown in a map, and when the conditions shown in the relationships are met, it may be judged that the vehicle is traveling in congested traffic.

In this manner, it is judged that the vehicle is traveling in congested traffic. When, in step 200b, it is judged as YES, processing proceeds to step 200c. In step 200c, the traffic congestion judgment is turned ON. Then, a traffic congestion level indicating the degree of traffic congestion is determined, and according to the traffic congestion level, an atmospheric temperature correction value and a brake temperature correction value are set. The atmospheric temperature correction value and the brake temperature correction value can thus be set according to the traffic congestion level, that is, the degree of an increase in the temperature in the wheel house.

The atmospheric temperature correction value is a temperature correction value used for correcting the atmospheric temperature indicated by the readings indicative of the detection signal of the temperature sensor 22. In light of the fact that the deviation between the atmospheric temperature and the temperature in the vicinity of the brake becomes greater as the traffic congestion level is higher, the atmospheric temperature correction value is set to be larger as the traffic congestion level is higher. The atmospheric temperature correction value may be a fixed value corresponding to the traffic congestion level determined when it is judged that the vehicle is traveling in congested traffic. However, the degree of the deviation between the atmospheric temperature and the temperature in the vicinity of the brake continues to vary after the judgment. Therefore, the atmospheric temperature correction value is preferably a variable value which is changed, as needed, according to the change in the traffic congestion level after the judgment.

The brake temperature correction value corresponds to the amount of increase in brake temperature during the time before it is judged that the vehicle is traveling in congested traffic. Like the atmospheric temperature correction value, the brake temperature correction value is set to be larger as the traffic congestion level is higher. When it is judged that the vehicle is traveling in congested traffic, the brake temperature correction value quickly cancels out the deviation between an atmospheric temperature and the temperature in the vicinity of the brake, which is caused during the time before it is judged that the vehicle is traveling in congested traffic. The brake temperature correction value is used only when it is judged that the vehicle is traveling in congested traffic. Therefore, the brake temperature correction value is not used even when the traffic congestion level varies after the correction.

Here, the atmospheric temperature correction value and the brake temperature correction value are increased as the traffic congestion level is higher. However, both the atmospheric temperature correction value and the traffic congestion level are not always required to be increased, and either one of them may be increased.

For example, the relationships between the low speed travel judgement threshold values and the low speed travel judgment times are shown in a map, and then, a plurality of traffic congestion levels are set in the map. The corresponding traffic congestion level is selected from the map, so that the atmospheric temperature correction value corresponding to the traffic congestion level can be determined. In addition, the relationships between the braking loads during low speed travel and the numbers of braking loads during low speed travel are shown in a map, and then, a plurality of traffic congestion levels are set in the map. The corresponding traffic congestion level is selected from the map, so that the brake temperature correction value corresponding to the traffic congestion level can be determined.

FIG. 8 is a map illustrating an example of the relationships between a plurality of low speed travel judgment threshold values, a plurality of low speed travel judgment times, and a plurality of traffic congestion levels. As illustrated in FIG. 8, each of the low speed travel judgment times corresponds to each of the low speed travel judgment threshold values. The corresponding one of the traffic congestion levels is selected from the map and is set. For example, as the vehicle speed is lower, the temperature in the vicinity of the brake is rises significantly, so that as the low speed travel judgment threshold value is smaller, the traffic congestion level becomes higher even when the low speed travel judgment time is short. As the low speed travel judgment time is longer, the traffic congestion level becomes higher. That is, it can be judged that the traffic congestion level is higher as the vehicle speed is equal to or less than the lower one among the low speed travel judgment threshold values or as the continuation time is equal to or more than the longer one among the low speed travel judgment times.

FIG. 9 is a map illustrating an example of the relationships between a plurality of braking loads during low speed travel, a plurality of the numbers of braking loads during low speed travel, and a plurality of traffic congestion levels. As illustrated in FIG. 9, each of the numbers of braking loads during low speed travel corresponds to each of the braking loads during low speed travel. The corresponding one of the traffic congestion levels is selected from the map and is set. For example, as the braking load is smaller, the vehicle is traveling at low speed and the temperature in the vicinity of the brake rises significantly, so that as the braking load during low speed travel is smaller, the traffic congestion level becomes higher even when the number of braking loads during low speed travel is small. As the number of braking loads during low speed travel is larger, the traffic congestion level becomes higher. That is, it can be judged that the traffic congestion level is higher as the braking load is equal to or less than the smaller one among the braking loads during low speed travel or as the number of braking loads is equal to or more than the larger one among the numbers of braking loads during low speed travel.

FIG. 10 is a map illustrating the relationships between a plurality of traffic congestion levels, a plurality of atmospheric temperature correction values, and a plurality of brake temperature correction values. As illustrated in FIG. 10, the atmospheric temperature correction value and the brake temperature correction value can be set to be larger as the traffic congestion level is higher.

As described above, the relationships between the low speed travel judgment threshold values and the low speed travel judgment times are shown in a map, and the relationships between the braking loads during low speed travel and the numbers of braking loads during low speed travel are shown in a map, and in accordance with the maps, it can be judged whether the vehicle is traveling in congested traffic. However, for example, at the traffic congestion levels 1 or above in the maps illustrated in FIGS. 8 and 9, it may be judged that the vehicle is traveling in congested traffic.

If, in step 200*b* in FIG. 5A and FIG. 5B, it is judged as NO, the vehicle is not traveling in congested traffic, or it is being judged whether the vehicle is traveling in congested traffic. In this case, processing proceeds to step 200*d*. In step 200*d*, in the present control cycle, the continuation time in which the vehicle speed is equal to or less than the low speed travel judgment threshold value and the number of braking loads during low speed travel in which the braking load is equal to or less than the braking load during low speed travel are held as previous values. In the next control cycle, in step 200*b*, the continuation time in which the vehicle speed is equal to or less than the low speed travel judgment threshold value and the number of braking loads during low speed travel in which the braking load is equal to or less than the braking load during low speed travel are calculated by using the previous values held here.

If, in step 200*a*, it is judged as NO, processing proceeds to step 200*e*. In step 200*e*, it is judged whether the vehicle speed is equal to or more than a high speed travel judgment threshold value. The high speed travel judgment threshold value is a threshold value for judging whether the vehicle has ended traveling in congested traffic and is traveling at high speed. While the vehicle is traveling at high speed, the atmospheric flow in the vicinity of the brake becomes greater, reducing the deviation between the temperature in the vicinity of the brake and the atmospheric temperature indicated by the readings indicative of the detection signal of the temperature sensor 22. Therefore, when the vehicle speed is equal to or more than the high speed judgment threshold value, it is judged that the vehicle has got out of traveling in congested traffic.

If, here, it is judged as YES, processing proceeds to step 200*f*. In step 200*f*, the traffic congestion judgment is switched to OFF, and processing is ended. If it is judged as NO, processing proceeds to step 200*g*. In step 200*g*, a previous value is held. That is, when the traffic congestion judgment is ON in the previous control cycle, the ON state is held. When the traffic congestion judgement is OFF in the previous control cycle, the OFF state is held. Then, processing is ended. In this manner, the traffic congestion judgment calculation process is ended.

When the traffic congestion judgment calculation process is ended, processing proceeds to step 205 in FIG. 4A and FIG. 4B. In step 205, it is judged whether the traffic congestion judgment is OFF. When it is judged as YES, the atmospheric temperature correction calculation process is ended because the vehicle is not traveling in congested traffic, it has not yet been judged that the vehicle is traveling in congested traffic, or travel in congested traffic is released. In this case, the atmospheric temperature indicated by the readings indicative of the detection signal of the temperature sensor 22 is directly used as the temperature in the vicinity of the brake.

If, in step 205, it is judged as NO, processing proceeds to step 210. In step 210, it is judged whether the traffic congestion judgment is switched from OFF to ON. When the traffic congestion judgment is switched to ON in step 200*c* in FIG. 5A and FIG. 5B, it is judged as YES in step 210. When the traffic congestion judgment is not switched to ON in step 200*c* in FIG. 5A and FIG. 5B, it is judged as NO.

If, in step 210, it is judged as YES, processing proceeds to step 215. In step 215, the atmospheric temperature correction value obtained in step 200*c* in FIG. 5A and FIG. 5B is added to the atmospheric temperature indicated by the readings indicative of the detection signal of the temperature sensor 22. Thus, obtained is an atmospheric temperature which is brought closer to the temperature in the vicinity of the brake in consideration of temperature rise due to travel in congested traffic (hereinafter referred to as the corrected atmospheric temperature). Either lower one of the brake temperature (n−1) determined in the previous control cycle and the corrected atmospheric temperature is set as a final atmospheric temperature. In other words, the corrected atmospheric temperature may be an atmospheric temperature which represents a final temperature in the vicinity of the brake. However, since the corrected atmospheric temperature does not rise above the brake temperature (n−1), a temperature upper limit is set to the brake temperature (n−1).

If, in step 210, it is judged as NO, processing proceeds to step 220. In this case, since the traffic congestion judgment is continuously ON, the atmospheric temperature set in the previous control cycle, that is, the atmospheric temperature set in step 215, is directly held. In this manner, the atmospheric temperature correction calculation process is ended. By using the atmospheric temperature which is set in consideration of the temperature rise during travel in congested traffic, the cooling temperature calculation process in step 115 in FIG. 2A and FIG. 2B is performed.

Then, processing proceeds to step 120. In step 120, a brake temperature calculation process is executed. FIG. 11A and FIG. 11B is a flowchart illustrating in detail the brake temperature calculation process. As illustrated in FIG. 11A and FIG. 11B, in step 120a, it is judged whether the traffic congestion judgment is switched from OFF to ON. When the traffic congestion judgment is switched to ON in step 200c in FIG. 5A and FIG. 5B, it is judged as YES. When the traffic congestion judgment is not switched to ON in step 200c in FIG. 5A and FIG. 5B, it is judged as NO.

If, in step 120a, it is judged as YES, processing proceeds to step 120b. In step 120b, a corrected brake cooling temperature is calculated by adding the brake temperature correction value obtained in step 200c in FIG. 5A and FIG. 5B to the brake cooling temperature determined in the cooling temperature calculation process. The corrected brake cooling temperature is determined in order to cancel out the deviation between the atmospheric temperature and the temperature in the vicinity of the brake, which is caused during the time before, in the traffic congestion judgment process, it is judged that the vehicle is traveling in congested traffic. Either lower one of a wheel house temperature upper limit value, which is an upper limit value assumed when the temperature in the wheel house rises, and the corrected brake cooling temperature is set as the final atmospheric temperature. In other words, the corrected brake cooling temperature may be directly set to a final brake cooling temperature. However, since the corrected atmospheric temperature does not rise above the wheel house temperature upper limit value, a temperature upper limit is set to the wheel house temperature upper limit value. Then, processing proceeds to step 120c.

If, in step 120a, it is judged as NO, processing proceeds to step 120c, not to step 120b. That is, when the traffic congestion judgment is OFF, the brake cooling temperature is not required to be corrected, and when the traffic congestion judgment is ON, the brake cooling temperature is corrected once when the traffic congestion judgment is switched from OFF to ON. Therefore, it is not necessary to correct the brake cooling temperature.

In step 120c, a brake temperature is calculated by adding the brake cooling temperature calculated in step 115 (or in step 120b) to the amount of increase in brake temperature in braking calculated in step 110. In this manner, the brake temperature calculation process is ended.

When the brake temperature is calculated, processing proceeds to step 125. In step 125, it is judged whether the brake temperature exceeds a fade temperature which is the threshold value of the fade judgment. When the brake temperature exceeds the fade temperature, processing proceeds to step 130. In step 130, the fade warning is issued. When the brake temperature does not exceed the fade temperature, processing proceeds to step 135. In step 135, the fade warning is released. In this manner, the fade warning process is completed.

FIG. 12 is a time chart in which the atmospheric temperature correction calculation process executed in the fade warning process is not executed during travel in congested traffic. FIG. 13 is a time chart in which the atmospheric temperature correction calculation process executed in the fade warning process is executed during travel in congested traffic.

As illustrated in FIG. 12, even when the atmospheric temperature correction calculation process is not executed, the calculated brake temperature is basically brought closer to the actual brake temperature. However, when the temperature in the wheel house rises significantly and greatly deviates from the atmospheric temperature, the deviation between the calculated brake temperature and the actual brake temperature is caused. Consequently, whether the fade warning is issued is judged in accordance with the calculated brake temperature lower than the actual brake temperature. This can cause the judgment to be erroneous, with the result that the fade warning is not issued although brake fade has occurred.

As illustrated in FIG. 13, when the atmospheric temperature correction calculation process is executed, the calculated brake temperature deviates from the actual brake temperature during the time before the judgment whether the vehicle is traveling in congested traffic is completed. However, when it is judged that the vehicle is traveling in congested traffic, the calculated brake temperature has a value determined in consideration of the brake temperature correction value, and the atmospheric temperature is corrected. Thus, after the judgment, the calculated brake temperature can be substantially equal to the actual brake temperature. Therefore, in accordance with the calculated brake temperature which is substantially equal to the actual brake temperature, it is judged whether the fade warning is issued. The fade warning can thus be issued more accurately.

As described above, in the fade warning process, in a situation in which the temperature in the vicinity of the brake has risen above the atmospheric temperature indicated by the readings indicative of the detection signal of the temperature sensor 22, for example, during travel in congested traffic, the atmospheric temperature correction value is determined, and an atmospheric temperature is corrected in accordance with the atmospheric temperature correction value. Then, a brake temperature is calculated in accordance with the corrected atmospheric temperature. This allows the calculated brake temperature to be brought closer to an actual brake temperature. The fade warning can thus be issued more accurately.

Further, the lock control may be exercised over the EPB 2 in accordance with the brake temperature calculated as described above. If the brake temperature is high when the EPB 2 is activated, the brake pad 11 thermally shrinks due to subsequent cooling. Heat slack then occurs in which the braking force generated by the EPB 2 is decreased. It is therefore possible to set a timing of ending an occasion of the lock control and the number of occasions of the lock control in consideration of the heat slack in accordance with the calculated brake temperature. More specifically, it is possible to set a timing of stopping the motor 10, a time interval between the end of a first occasion of the lock control and a timing at which the locked state is achieved again in the next occasion of the lock control, and the number of occasions of the lock control in each of which the locked state is achieved again.

When, for instance, the EPB-ECU 9 controls the EPB 2, the current flowing in the motor 10 corresponds to the load imposed on the motor 10. The load imposed on the motor 10 corresponds to the pressing force applied from the brake pad 11 to the brake disc 12. Therefore, the EPB-ECU 9 detects the motor current. When the motor current has reached the target motor current, the pressing force applied from the brake pad 11 to the brake disc 12 has the desired pressing value. Then, the EPB-ECU 9 judges that the brake force exerted by the EPB 2 has reached the target braking force, and accordingly stops driving the motor 10. Consequently, a situation in which the desired braking force is generated by the EPB 2 is maintained also when the vehicle is parked.

In the above instance, the target motor current is calculated by a target motor current calculation process. The target motor current calculation process may be performed to calculate the target motor current in consideration of the brake temperature. For example, when a coefficient term corresponding to the brake temperature is defined and set so that the target motor current increases with an increase in the brake temperature, the desired braking force for sufficiently keeping the vehicle parked can be generated even if the brake pad 11 is cooled to a low temperature while the vehicle is parked.

Further, the desired braking force can also be generated by calculating the time required for the EPB-ECU 9 to re-execute the lock control over the EPB 2 and the number of occasions in which the lock control over the EPB 2 is re-executed. While the vehicle is parked, the degree of heat slack varies depending on the brake temperature at the first occasion of the lock control. Therefore, the time required for re-executing the lock control and the number of occasions in which the lock control is re-executed may be calculated in accordance with the brake temperature at the first occasion of execution of the lock control. For example, if the brake temperature is high when the lock control is performed at the first occasion while the vehicle is parked, the brake temperature is rapidly lowered because the brake temperature greatly differs from the atmospheric temperature. This increases the degree of heat slack. Therefore, the desired braking force can be generated by performing the lock control again after a shorter period of time passes subsequent to the first occasion of the lock control while the vehicle is parked, and by performing the lock control again after another certain period of time passes. If, on the other hand, the brake temperature is low when the lock control is performed at the first occasion, the desired braking force can be generated to keep the vehicle parked by performing the lock control again after a longer period of time passes subsequent to the first occasion of the lock control while the vehicle is parked.

Consequently, even if heat slack occurs, the desired braking force for keeping the vehicle parked can be generated by calculating the brake temperature as described above, calculating the target motor current for the lock control in accordance with the calculated brake temperature, determining the end timing of the lock control in accordance with the target motor current, calculating the time required for the re-execution of the lock control and the number of occasions in which the lock control is re-executed in accordance with the brake temperature, and re-executing the lock control.

Other Embodiments

The present invention is not limited to the above embodiment. Various modifications can be made as needed without departing from the scope of the claims.

For example, the foregoing embodiment has been described on the assumption that the brake temperature is detected to perform the fade warning process or that the lock control is exercised in consideration of heat slack of the EPB 2. However, an alternative control scheme may be used, for instance, to drive the pumps and control valves included in the actuator 7 to raise the W/C pressure in consideration of the effect of the brake, which varies with the brake temperature, when the service brake is operated under normal conditions.

Further the foregoing embodiment has been described on the assumption that the EPB 2 is of a disc brake type and provided with the brake pad 11, which serves as a friction material, and the brake disc 12, which serves as a friction target material. However, an alternative is to use a different type of EPB 2, such as a drum brake type EPB. When such an alternative is adopted, a brake shoe is used as a friction material while a drum is used as a friction target material.

In the embodiment, both of the judgment whether a state in which the vehicle speed is equal to or less than the low speed travel judgment threshold value continues for the low speed travel judgment time and the judgment whether a state in which the braking load is equal to or less than the braking load during low speed travel continues the number of braking loads during low speed travel are performed. However, either one of the judgments may be performed. In addition, the traffic congestion level is judged in accordance with both judgments. However, it may be judged in accordance with either one of the judgments. Further, when it is judged that the vehicle is traveling in congested traffic, both of the atmospheric temperature correction value and the brake temperature correction value are set. However, at least the atmospheric temperature correction value may be set. By setting the brake temperature correction value, the deviation between the atmospheric temperature and the temperature in the vicinity of the brake during the time before it is judged that the vehicle is traveling in congested traffic can be quickly canceled out, when it is judged that the vehicle is traveling in congested traffic.

The steps illustrated in the drawings correspond to the means executing the processes. That is, the section that executes the process in step 110 corresponds to the means that calculates the amount of increase in brake temperature, the section that executes the process in step 115 corresponds to the cooling temperature calculation means, and the section that executes the process in step 120 corresponds to the brake temperature calculation means. The section that executes the process in step 200 corresponds to the temperature rise judgment means, and the section that executes the process in step 200c corresponds to the traffic congestion level judgment means.

REFERENCE SIGNS LIST

1 . . . service brake, 2 . . . EPB, 3 . . . brake pedal, 4 . . . brake booster, 6 . . . wheel cylinder (W/C), 7 . . . actuator, 10 . . . motor, 11 . . . brake pad, 12 . . . brake disc, 20 . . . operation switch (SW), 21 . . . acceleration sensor, 22 . . . temperature sensor, 23 . . . release indicator lamp, 24 . . . display device

The invention claimed is:

1. An electric parking brake control device for controlling an electric parking brake that drives a motor to generate a pressing force for pressing a friction material against a friction target material and generates a braking force by causing friction between the friction material and the friction target material, the electric parking brake control device comprising:

lock control means that executes lock control by driving the motor to generate the pressing force and let the electric parking brake generate the braking force, stopping the drive of the motor to maintain the braking force to achieve a locked state when the braking force reaches a target braking force; and a brake temperature calculation device that calculates a brake temperature in each control cycle, said brake temperature calculation device including:

means that calculates the amount of increase in brake temperature when a vehicle is braked; temperature rise judgment means that judges whether a temperature in a wheel house in the vehicle has risen above the atmospheric temperature indicated by the readings indicative of the calculation signal of a temperature sensor provided in the vehicle;

cooling temperature calculation means that calculates a brake cooling temperature in accordance with a difference between an atmospheric temperature indicated by a readings indicative of a calculation signal of the temperature sensor and a brake temperature calculated in the previous control cycle when the vehicle is not braked, the brake cooling temperature being a temperature of the brake cooled by natural cooling and corrects the atmospheric temperature by adding an atmospheric temperature correction value to the atmospheric temperature indicated by the readings indicative of the calculation signal of the temperature sensor, and uses the corrected atmospheric temperature to calculate the brake cooling temperature when the temperature rise judgment means judges that the temperature in the wheel house has risen above the atmospheric temperature indicated by the readings indicative of the calculation signal of the temperature sensor; and brake temperature calculation means that calculates a brake temperature in the present control cycle by adding the amount of increase in brake temperature to the brake cooling temperature; and wherein the lock control means sets a timing of ending the lock control or the control count of the lock control in accordance with the brake temperature calculated by the brake temperature calculation device.

2. The electric parking brake control device according to claim 1, wherein when the temperature rise judgment means judges that the temperature in the wheel house has risen above the atmospheric temperature indicated by the readings indicative of the calculation signal of the temperature sensor, the cooling temperature calculation means corrects the brake cooling temperature by adding a brake temperature correction value to the brake cooling temperature, wherein the brake temperature calculation means uses the corrected brake cooling temperature to calculate the brake temperature.

3. The electric parking brake control device according to claim 2, the temperature rise judgment means judges that the temperature in the wheel house has risen above the atmospheric temperature indicated by the readings indicative of the calculation signal of the temperature sensor when the vehicle is traveling in congested traffic, and corrects the atmospheric temperature to a value higher than the atmospheric temperature indicated by the readings indicative of the calculation signal of the temperature sensor.

4. The electric parking brake control device according to claim 2, further comprising traffic congestion level judgment means that judges a traffic congestion level indicating a degree of traffic congestion, wherein either or both of the atmospheric temperature correction value and the brake temperature correction value are set to be larger as the traffic congestion level is higher.

5. The electric parking brake control device according to claim 4, wherein the traffic congestion level judgment means has a plurality of low speed travel judgment threshold values each of which is a threshold value to be compared with a vehicle speed of the vehicle, and a plurality of low speed travel judgment times each of which is a threshold value to be compared with a continuation time in which the vehicle speed is equal to or less than the low speed travel judgment threshold value, and judges that the traffic congestion level is higher as the vehicle speed is equal to or less than the lower one among the low speed travel judgment threshold values or as the continuation time is equal to or more than the longer one among the low speed travel judgement times.

6. The electric parking brake control device according to claim 4, wherein the traffic congestion level judgment means has a plurality of braking loads during low speed travel each of which is a threshold value to be compared with a braking load represented by a braking initial speed being the vehicle speed at the start of braking and the number of brakings per predetermined distance, and a plurality of numbers of braking loads during low speed travel each of which is a threshold value to be compared with the number of braking loads equal to or less than the braking load during low speed travel, and judges that the traffic congestion level is higher as the braking load is equal to or less than the smaller one among the braking loads during low speed travel or as the number of braking loads equal to or less than the braking load during low speed travel is equal to or more than the larger one among the numbers of braking loads during low speed travel.

* * * * *